Jan. 27, 1970  E. J. OSTLING  3,491,820
FLEXIBLE JOINT STRUCTURE AND CLIPS THEREFOR
Filed May 29, 1968

INVENTOR
EDWARD J. OSTLING

BY Price, Heneveld, Huizenga & Cooper
ATTORNEYS

Jan. 27, 1970    E. J. OSTLING    3,491,820
FLEXIBLE JOINT STRUCTURE AND CLIPS THEREFOR
Filed May 29, 1968    2 Sheets-Sheet 2

INVENTOR
EDWARD J. OSTLING

BY Price, Heneveld, Huizenga & Cooper
ATTORNEYS

United States Patent Office 3,491,820
Patented Jan. 27, 1970

3,491,820
FLEXIBLE JOINT STRUCTURE AND CLIPS THEREFOR
Edward J. Ostling, Muskegon, Mich., assignor to Modular Systems, Inc., Fruitport, Mich., a corporation of Michigan
Filed May 29, 1968, Ser. No. 733,047
Int. Cl. F16b 12/22
U.S. Cl. 151—41.7                   12 Claims

ABSTRACT OF THE DISCLOSURE

This disclosure relates to a flexible clip for securing structural members together to make a joint and to the joint thus formed with the clip. The clip is made from a one piece metal plate and has two end flanges and a raised central portion. One end flange is joined at one end of the central portion by a wall which is solid at least at the corners. The second end flange is joined at another end of the central portion through spaced upstanding legs forming an opening therebetween. A tapered wedging slot is provided on the raised central portion, the slot having a closed end extending from a point intermediate the ends of the central portion to an open end extending into the opening between the legs. Preferably the legs extend upwardly from a solid wall portion and an integral locking flange extends up from the wall portion. The clip is preferably recessed into a structural member in making the joint so as to conceal the means of fastening the structural members together. A stud on a second panel abuts the first panel to engage the slot on the clip to draw the two members together.

---

This invention relates to flexible joint structures and flexible clips therefor. In one of its aspects, the invention relates to a flexible clip for a joint structure having a raised central portion with an open ended, tapered wedging slot.

In another of its aspects, the invention relates to a flexible clip for a joint structure having an integral locking flange which locks a stud member within a slot in a raised central portion of the clip.

In still another of its aspects, the invention relates to a joint structure employing a flexible clip having one or more of the above described features and a stud member having an enlarged head engaging the slot of the clip so as to maintain contact between the two structural members.

Many joints, such as modern furniture parts, are now fastened together by concealed mechanical connectors. Many of these fasteners employ keyhole slots and stud-like fasteners. For glueless wood furniture joints, it is necessary to have the joint flexible so that it can expand and contract with the furniture so as to avoid pulling of the stud member out of one panel or to avoid loosening of the joint when the wood dries.

As an example of one type of flexible joint structure, reference is made to Mark, 3,332,182, who discloses a partition stud and spring assembly in which a spring loaded stud on one panel member engages a keyhole slot on a second panel member.

Clarke-James, 1,533,724 discloses a glueless joint in which a bracket on one panel has a front plate and a smaller wedging plate which engages a plate on a second panel through a raised central portion which has an open ended slot. The front plate fits beneath the central plate and the smaller wedging plate abuts the slot to provide a stop for the plate. The disclosed joint is secured but is not flexible and the joint is not locked in place.

Budai, 2,708,292 discloses a furniture joint having a clip with a keyhole slot in a raised central portion for engaging a screwhead. A locking flange is secured to an outer bottom flange through a screw for locking the screwhead within the keyhole slot.

I have now discovered an improved clip and joint structure in which one end of the clip is more flexible than the other and the load is borne by the less flexible end. In one embodiment, the clip has an integral locking flange and a slot with a wedging surface to make a tight joint as the furniture is assembled.

By various aspects of this invention, one or more of the following, or other, objects can be obtained.

It is an object of this invention to provide an improved glueless joint structure for furniture and the like which joint structure is flexible to accommodate furniture expansion and contraction.

It is a further object of this invention to provide an improved glueless joint structure having a strong but yieldable joint.

It is yet another object of this invention to provide an improved clip for a joint which clip is flexible and strong wherein the flexibility of the clip does not detract from the strength.

It is yet another object of this invention to provide a clip structure for joints in which a stud is locked into the clip when the joint is assembled wherein the clip has means for drawing the joint tightly together as the stud is fastened within the clip.

It is yet another object of this invention to provide a one piece clip for furniture joints in which a stud is locked into the clip after assembly thereof.

Other aspects, objects, and the several advantages of this invention are apparent to one skilled in the art from a study of this disclosure, the drawings, and the appended claims.

According to the invention, there is provided a clip for use in a joint structure. The clip is made from a one piece metal plate and has first and second end flanges, a central portion lying in a plane above the general plane of either of the end flanges and connected to the first end flange at one end thereof through a solid wall member and to the second end flange at the other end thereof through a pair of spaced upstanding legs forming an opening therebetween. A slot is formed in the central portion of the clip. The slot has a closed end and an open end, the closed end being at a point intermediate the ends of the central portion and the open end extending to and communicating with the opening between the legs. Preferably, the closed end of the slot is nearest the solid wall member.

In one embodiment, there are wedging surfaces at opposite sides of the slot, the wedging surfaces tapering downwardly from a point near the open end toward the closed end. In this manner when the clip is attached to one panel and a stud having an expanded head larger than the slot is attached to a second panel, the stud and the panels will be drawn together as the stud is moved into the slot.

In another embodiment, the clip has an integral locking flange between the upstanding legs, the locking flange extending upwardly at an angle to the central portion to a point short of and slightly below the slot closed end to permit an expanded head of a stud to pass the end of the locking flange by depressing the locking flange as it passes into the closed end of the slot to prevent removal of the stud from the closed end past the locking flange without first depressing the locking flange.

Preferably, the clip is made from a strong and resilient metallic material and the clip flexes through the upstanding legs whereas the stress of the joint is concentrated on the stronger solid wall attaching the central portion to the first end flange.

The invention will now be described with reference to the accompanying drawings in which.

Figure 1:
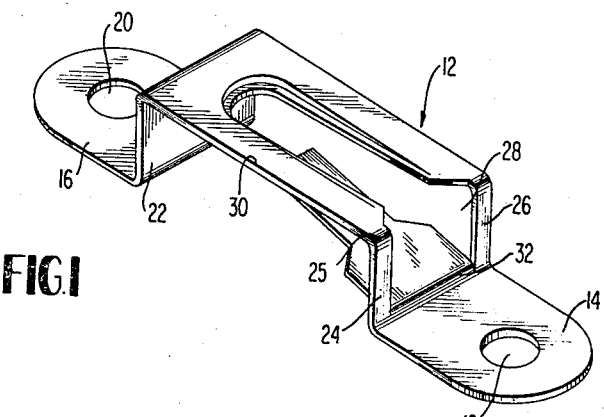
FIG. 1 is a perspective view of a novel clip according to the invention.
Figure 4:
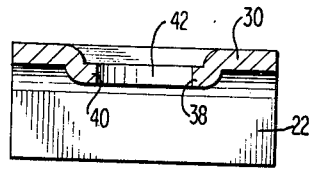
FIG. 4 is a sectional view taken along lines IV—IV of FIG. 2.
Figure 2:
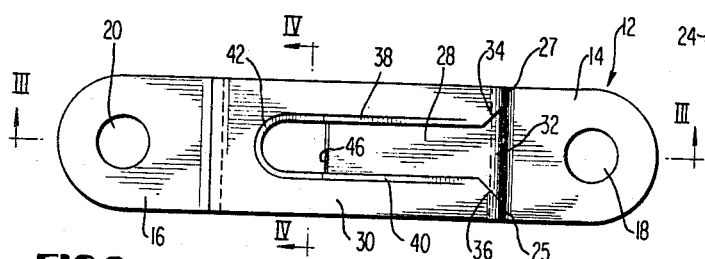
FIG. 2 is a plan view of the clip shown in FIG. 1.
Figure 5:
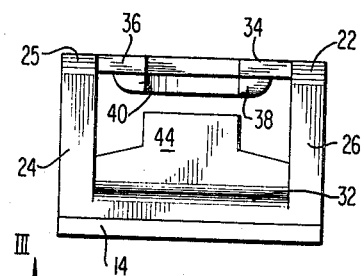
FIG. 5 is an end view of the clip shown in FIGS. 1 through 4.
Figure 3:
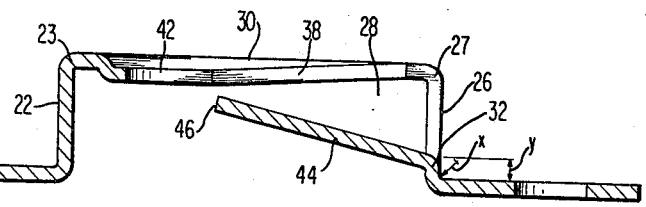
FIG. 3 is an elevational view taken along lines III—III of FIG. 2.

Referring now to the drawings, and to FIGS. 1 through 5 in particular, a clip 12 has end flanges 14 and 16. Flange 14 has a hole 18 and flange 16 has a hole 20. The clip has a generally raised central portion joined to an upstanding end wall 22 at one end and to spaced upstanding legs 24 and 26 at the other end. The end flange 16 joins the bottom portion of end wall 22. The upstanding legs 24 and 26 are formed integrally with an upstanding wall portion 32 which is joined to end flange 14. A top wall 30 is formed between the upstanding end wall 22 and the upstanding legs 26 and 24. A corner 23 is formed between top wall 30 and upstanding end wall 22. A corner 27 is formed between upstanding leg 26 and top wall 30. Still another corner is formed between upstanding leg 24 and top wall 30.

A slot 28 is formed in part by upstanding legs 24 and 26. This slot 28 extends into the central portion of top wall 30 near corner 23.

The slot 28 is defined by the top of upstanding wall portion 32, the inside edge of upstanding wall portion 26, inwardly slanted surface 34, end receiving portion 42, wedging flange 40, inwardly slanted surface 36, and the inside edge of upstanding leg 24.

The outer open portion of the slot 28 in the top surface 30 has a downwardly extending wedge portion formed by wedging flanges 38 and 40. The wedging surfaces slope downwardly toward the plane of the flanges 14 and 16 from the open end to the closed end of slot 28. The end receiving portion 42 is parallel to, but spaced downwardly of top wall 30.

In a preferred embodiment of the invention, shown in FIGS. 1 through 5, the clip has an integrally formed locking flange 44 which can be cut from the clip at the time the clip is formed. The locking flange 44 extends from the top of upstanding wall portion 32 and has an end portion 46 which is vertically aligned with one edge of end receiving portion 42.

It is possible to form the clip without having an upstanding wall portion such as 32. In other words, the bottom of the locking flange 44 would extend from the bottom of end flange 14. However, in the preferred embodiment as shown in the drawings, the upstanding wall portion 32 extends upwardly a height of Y, a distance sufficient to provide substantial strength between wall portion 32 and end flange 14. The radius of curvature of the bend at the junction between wall portion 32 and end flange 14 is X. Preferably, the height Y of upstanding wall portion 32 is at least as great as the radius of curvature X.

Figure 6:
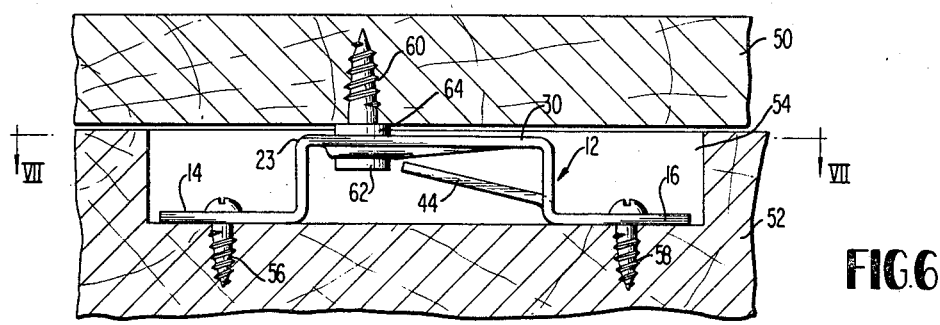
FIG. 6 is a sectional view through a wood joint illustrating the use of the clip in a joint structure.
Figure 7:
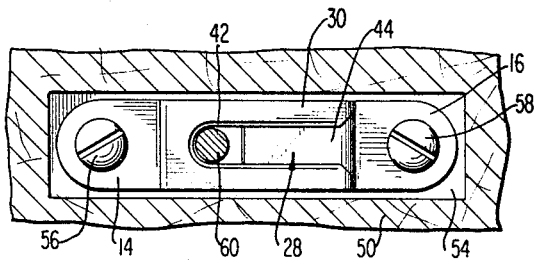
FIG. 7 is a plan view of the joint structure shown in FIG. 6 generally seen along lines VII—VII of FIG. 6.

The utility of the novel clip is illustrated in FIGS. 7 through 11. Referring now specifically to FIGS. 6 and 7, the clip 12 is employed to fasten a furniture joint, for example, comprising a first panel 50 and a second panel 52. The clip 12 is positioned in the bottom of a slot 54 cut in the end of the first panel 50. Wood screws 56 and 58 are employed in fastening the end flanges 14 and 16, respectively, to the bottom of the slot 54. The panels are preferably wood panels.

A shoulder wood screw or stud 60 is fixed in the side of the second panel 52. The shoulder wood screw 60 has a head 62 and a shoulder 64. The head 62 has means (not shown), such as a slot, for engaging a screwdriver so that the shoulder wood screw 60 may be easily fastened in the second panel 52.

The two panels are securely fastened together by inserting the head 62 in slot 28. The wide opening of the slot formed by inwardly slanted surfaces 34 and 36 tends to center the screw within the slot. The panel 50 is then forced to the left relative to the second panel 52 as seen in FIG. 6. During this relative movement between panel 50 and 52, the screw 60 will move to the left relative to the clip 12 in slot 28. This movement will cause wedging surfaces 38 and 40 to draw the head 62 of the shoulder screw 60 downwardly (as viewed in FIG. 6) into the slot. thereby pulling the first and second panels 50 and 52 tightly together. The movement of head 62 to the left will force locking flange 44 downwardly until the head 62 reaches the end receiving portion 42. At this point, the flange 44 will return to the normal position as shown in FIG. 6 to lock the wood screw 62 in place within the slot.

Figure 8:
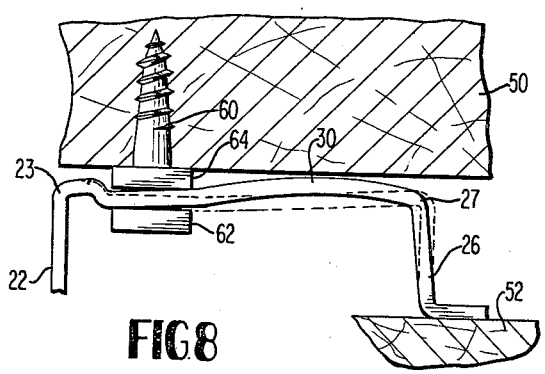
FIG. 8 is an enlarged view of the structure such as shown in FIG. 6, showing in exaggerated form, the flexible nature of the clip.

The flexible nature of the clip is illustrated in FIG. 8. The weakest portions of the clip are corners 27 and 25. Accordingly, as the force between screw 60 and clip 12 increases, the top wall 30 will tend to bow outwardly as shown in FIG. 8. The dotted lines of FIG. 8 show the normal portion. During this bowing operation, the corners 25 and 27 will give and legs 24 and 26 will flex inwardly. Since upstanding wall 22 and corner 23 are solid members and of a greater width than the total width of upstanding legs 24 and 25, there will be substantially no flexibility of the clip at corner 23 or at upstanding end wall 22. This is a desirable condition since the major load and the strength of the clip resides to a great extent in upstanding end wall 22 and corner 23. Thus, the flexibility of the clip is most remotely spaced from the area of greatest stress.

The flexible clip of the invention provides a strong clip to securely fasten together joints such as furniture joints. The clip provides sufficient flexibility, however, to permit expansion and contraction of the wood members themselves without losing the securely fastened nature of the joints. In normal clips, wherein little or no flexibility is present, the screw can be pulled out of the wood during wood swelling or the joint can become very loose during wood drying.

Figure 9:
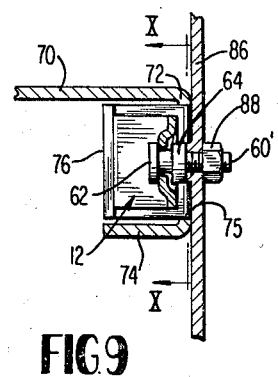
FIG. 9 is a side elevational view in section, of a joint between a metal shelf and a supporting side wall in which joint a clip according to the invention is employed.
Figure 10:
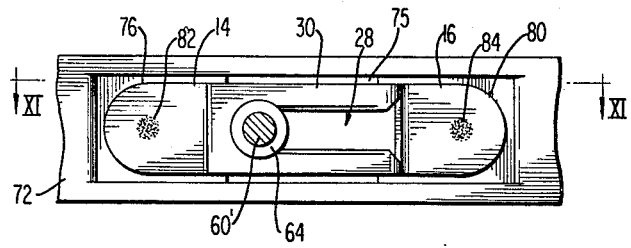
FIG. 10 is a side elevational view of the joint shown in FIG. 9 taken along lines X—X of FIG. 9.
Figure 11:
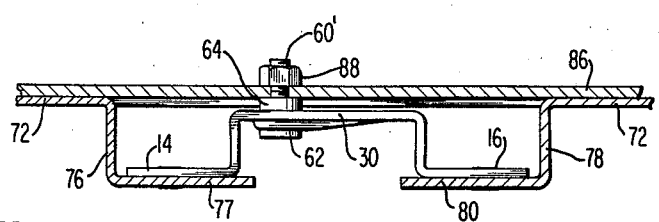
FIG. 11 is a plan view of the joint structure of FIGS. 9 and 10 taken along lines XI—XI of FIG. 10.

The applicability of the clip to a metal joint is illustrated in FIGS. 9 through 11. Referring now specifically to FIGS. 9 through 11, the clip is used to fasten a metal shelf 70 to a metal side wall 86. The metal shelf 70 has a downwardly extending flange 72, and an inwardly extending flange 74 at the bottom portion thereof. A recess is formed in the downwardly extending flange 72 by cutting the flange to form a slot 75. The cut portions are bent inwardly at 76 and 78 and laterally at 77 and 80.

The clip is attached to the shelf by welding end flange 14, for example, to laterally bent wall portion 77, and by welding end flange 16 to laterally bent wall portion 80. Other fastening means such as metal screws and bolts can also be employed.

A metal screw 60' has a shoulder 64 and a head 62. The metal screw 60' may be attached to the metal side wall 86 by threadably engaging the same and/or by threadably engaging a back plate or bolt 88.

In the embodiment shown in FIGS. 9 through 11, no locking flange has been shown. However, it is within the scope of a broader aspect of the invention to also employ a locking flange in this construction or to omit the locking flange from the other types of joint construction.

In operation, the joint is quickly and simply assembled by merely placing the head 62 of metal screw 60' in slot 28 of the clip 12. The clip is then moved to the right relative to the metal screw 60' as seen in FIGS. 10 and 11. This movement will wedge the clip in place, drawing the downwardly extending flange 72 tightly against the metal side wall 86. This construction provides for a tight engagement between the shelves and the supporting side walls and still permits removal of the shelves as desirable.

As an alternate embodiment, the metal side wall 86 can have a vertical slot in which the metal screw 60' is slidable. In this manner, these shelves can be adjusted before or after assembly thereof. Other arrangements of supporting elements in lieu of metal side wall 86 will be suggested to those skilled in the art. For example, the metal side wall 86 can be replaced by vertical rails which engage the metal screws 60'. Such rails which can be used are those disclosed in Tassel, U.S. Patent 3,179,257.

The flexible nature of the clips, permit the joint to be constructed cheaply and easily due to the fact that less tolerances are required to be maintained. The wedging nature and the flexibility of the clips permit more latitude in tolerances than has been heretofore possible. For example, if the slot 54 of FIG. 6 is too deep, and inflexible clip would pull the wood screw 60 out of the wood. However, the flexibility of this clip permits the joint to be securely made without pulling the screw from the wood.

Reasonable variation and modification are possible within the scope of the foregoing disclosure and drawings without departing from the spirit of the invention.

The embodiments of the invention in which an exclusive property or privilege is claimed are defined as follows.

1. A clip for use in a joint structure comprising:
  a one piece metal plate having first and second end flanges, a central portion above the general plane of either of said end flanges and joined to said first end flange at one end thereof through a solid wall member and to said second end flange at the other end thereof through a pair of spaced upstanding legs forming an opening therebetween;
  a solid wall portion extending upwardly from said second end flange and joining said second end flange to said spaced upstanding legs, said solid wall portion extending above said second flange a sufficient distance to provide substantial strength between said wall portion and said second end flange;
  a slot formed in said central portion, said slot having a closed end and an open end, said closed end being at a point intermediate the ends of said central portion and said open end extending to and communicating with said opening between said legs;
  wedging surfaces at opposite sides of said slot, said wedging surfaces tapering downwardly from a point near said open end toward said closed end;
  whereby a stud having an expanded head larger than said slot and positioned within said slot will be drawn downwardly toward the planes of said end flanges as said stud is moved relative to said clip in a direction from said open end to said closed end.

2. A clip according to claim 1 wherein said clip is made of a strong resilient material so as to flex and provide a yielding force to said stud as said stud is forced into said slot.

3. A clip according to claim 1 wherein said solid wall portion extends above said second end flange a distance at least as great as the radius of curvature between said wall portion and said second end flange.

4. A clip according to claim 1 wherein an integral locking flange is formed between said upstanding legs as an extension of said wall portion, said locking flange extends upwardly at an angle to said central portion to a point short of and slightly below said slot closed end to permit an expanded head of a stud to pass the end of said locking flange into said slot closed end by depressing said locking flange as it passes into said closed end, but to prevent removal of said stud from said closed end past said locking flange without first depressing said locking flange.

5. A clip according to claim 1 further comprising an integral locking flange formed between said upstanding legs, said locking flange extending upwardly at an angle to said central portion to a point short of and slightly below said slot closed end to permit an expanded head of a stud to pass the end of said locking flange by depressing said locking flange as it passes into said closed end, but to prevent removal of said stud from said closed end past said locking flange without first depressing said locking flange.

6. A joint structure comprising:
  a first panel member and a second panel member having surfaces in contacting relationship;
  said first panel member having a recessed area along a surface in contact with said second panel;
  a clip fastened in said recessed area, said clip being constructed according to claim 1 with said first and second flanges being fastened to the bottom of said recess and said central portion being spaced above the bottom of said recess in close proximity to but below the plane of said surface in contact with said second panel;
  a stud member fixed in said second panel, said stud having an enlarged head extending above and spaced from a surface in contact with said first panel member and juxtaposed to said recessed area of said first panel member, said stud enlarged head being positioned beneath said central portion within said slot so as to strongly and yieldingly hold said first and second panel members in contact with each other.

7. A joint structure according to claim 6 wherein said clip is made of a strong resilient material so as to flex and provide yielding force to said stud as said stud is forced into said slot.

8. The joint structure of claim 6 wherein said solid wall portion extends above said second end flange a distance at least as great as the radius of curvature between said wall portion and said end flange.

9. A joint structure according to claim 8 wherein an integral locking flange is formed between said upstanding legs as an extension of said wall portion, said locking flange extending upwardly at an angle to said central portion to a point short of and slightly below said slot closed end to permit an expanded head of a stud to pass the end of said locking flange by depressing said locking flange as it passes into said closed end, but to prevent removal of said stud from said closed end past said locking flange without first depressing said locking flange.

10. A joint structure according to claim 6 wherein an integral locking flange is formed between said upstanding legs, said locking flange extends upwardly at an angle to said central portion to a point short of and slightly below said slot closed end to permit an expanded head of a stud to pass the end of said locking flange by depressing said locking flange as it passes into said closed end, but to prevent removal of said stud from said closed end past said locking flange without first depressing said locking flange.

11. A clip for use in a joint structure comprising:
  a one piece metal plate having first and second end flanges, a central portion above the general plane of either of said end flanges and joined to said first end flange at one end thereof through a solid wall member and to said second end flange at the other end thereof through a pair of spaced upstanding legs forming an opening therebetween;

a solid wall portion extending upwardly from said second end flange and joining said second end flange to said spaced upstanding legs, said solid wall portion extending above said second end flange a sufficient distance to provide substantial strength between said wall portion and said second end flange;

a slot formed in said central portion, said slot having a closed end and an open end, said closed end being at a point intermediate the ends of said central portion and said open end extending to and communicating with said opening between said legs;

an integral locking flange formed between said upstanding legs as an extension of said solid wall portion, said locking flange extending upwardly at an angle to said central portion to a point short of and slightly below said slot closed end to permit an expanded head of a stud to pass the end of said locking flange by depressing said locking flange as it passes into said closed end, but to prevent removal of said stud from said closed end past said locking flange without first depressing said locking flange.

12. A joint structure comprising:

a first panel member and a second panel member having surfaces in contacting relationship;

said first panel member having a recessed area along a surface in contact with said second panel;

a clip fastened in said recessed area, said clip being constructed according to claim 7 with said first and second end flanges being fastened to the bottom of said recess and said central portion being spaced above the bottom of said recess in closed proximity to but below the plane of said surface in contact with said second panel;

a stud fixed to said second panel, said stud having an enlarged head extending above and spaced from a surface in contact with said first panel member and juxtaposed to said recessed area of said first panel member, said stud enlarged head being positioned between said central portion within said slot so as to strongly and yieldingly hold said first and second panel members in contact with each other.

References Cited

UNITED STATES PATENTS

| | | | |
|---|---|---|---|
| 1,351,119 | 8/1920 | Ogden | 52—711 |
| 1,533,724 | 4/1925 | Clarke-James | 287—20.924 |
| 2,708,292 | 5/1955 | Budai | 287—20.926 |
| 2,882,110 | 4/1959 | Mutchnik | 287—20 |
| 3,159,440 | 12/1964 | Courtwright | 287—20.926 |
| 3,178,775 | 4/1965 | Tassell | 52—474 |
| 3,178,987 | 4/1965 | Reese et al. | 85—8.8 |
| 3,239,988 | 3/1966 | Meyer | 85—8.8 |
| 3,288,192 | 11/1966 | Bollinger | 151—41.75 |
| 3,270,995 | 9/1966 | Shears | 248—224 |
| 3,430,674 | 3/1969 | Forbush | 151—41.7 |

MARION PARSONS, JR., Primary Examiner

U.S. Cl. X.R.

52—474; 248—225; 287—20.926